United States Patent Office 2,923,579
Patented Feb. 2, 1960

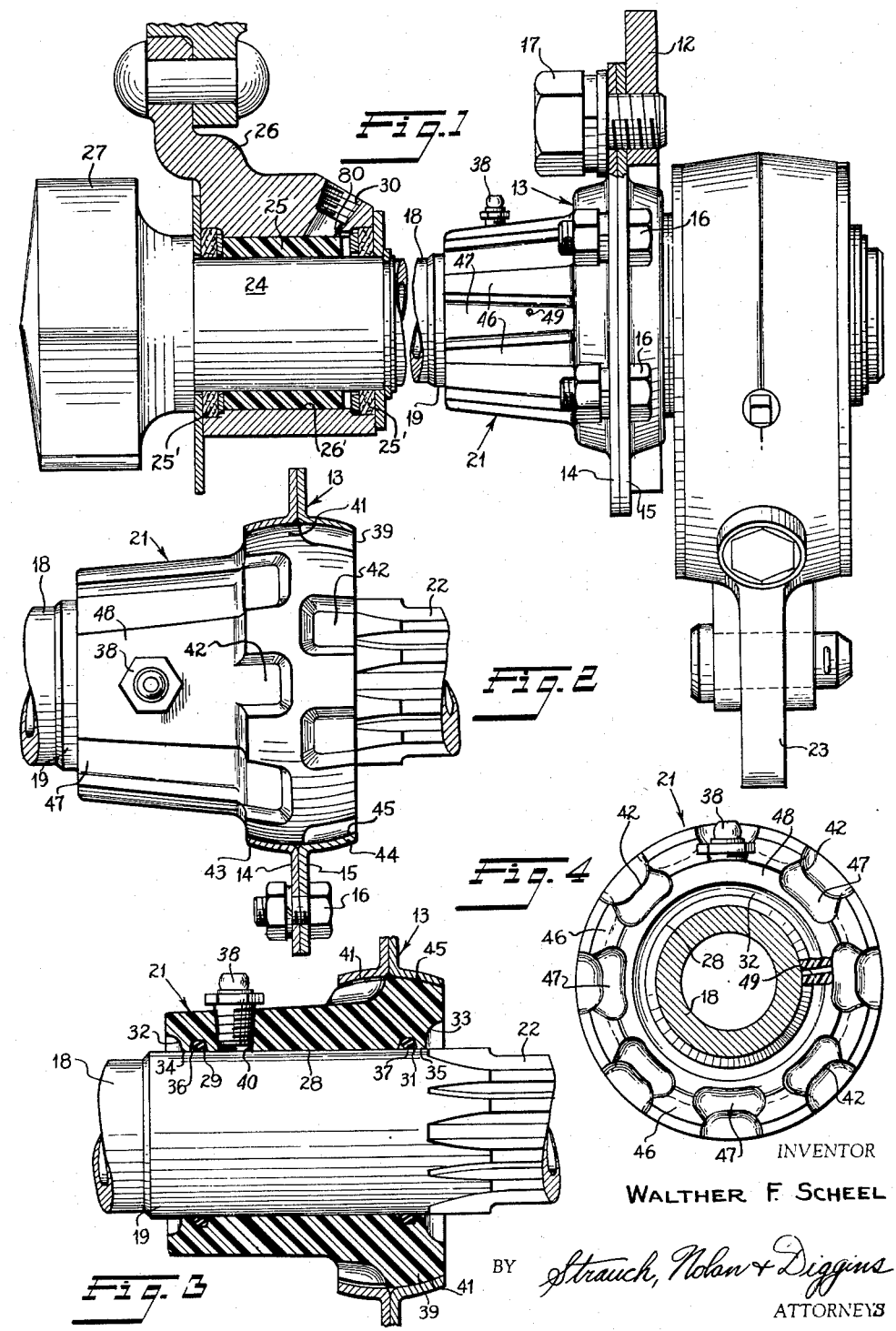

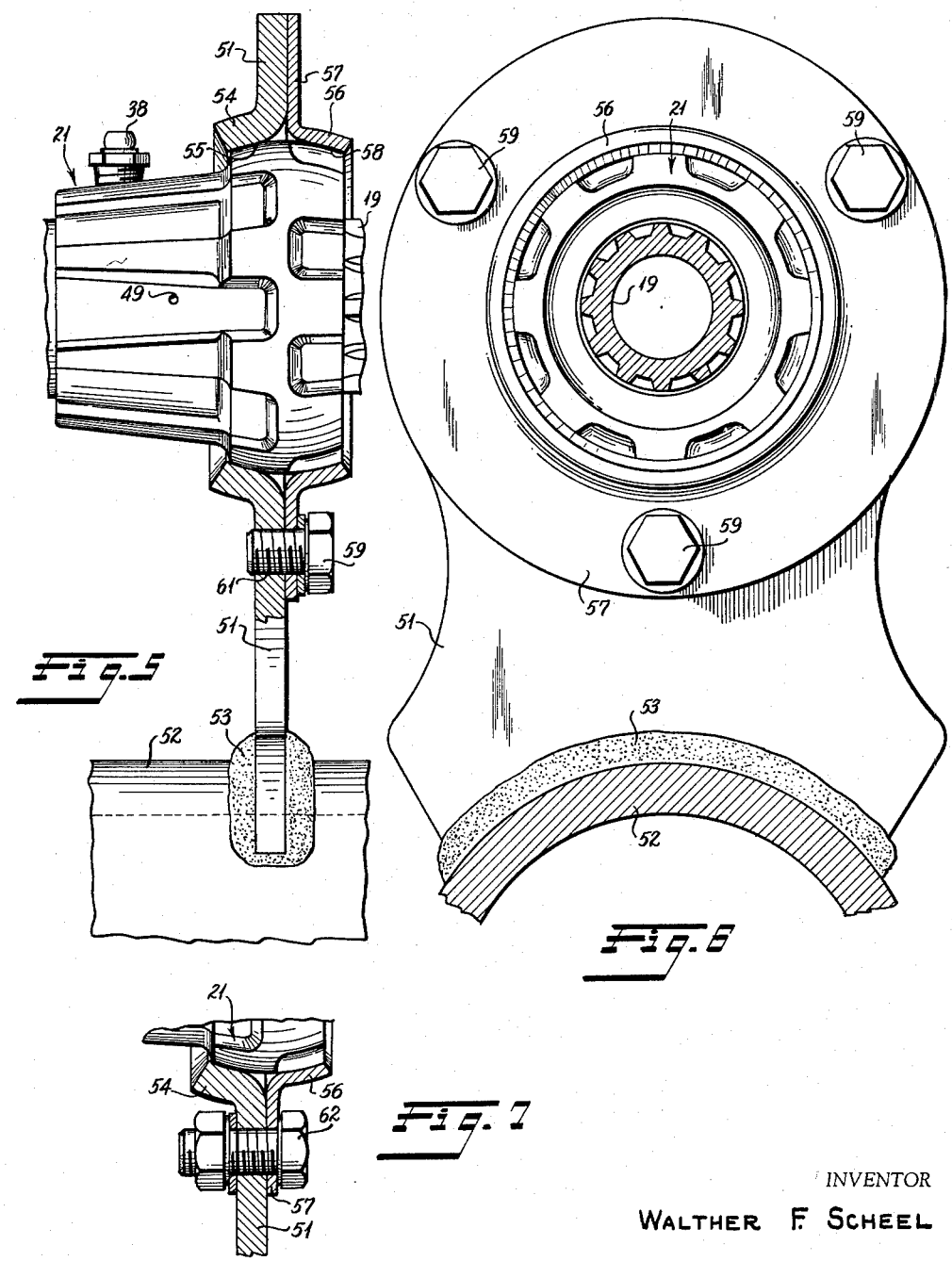

2,923,579

SHAFT SUPPORT

Walther F. Scheel, Detroit, Mich., assignor to Rockwell-Standard Corporation, a corporation of Pennsylvania Application July 6, 1954, Serial No. 441,320

8 Claims. (Cl. 308—15)

This invention relates to low friction mounts for shafts and the like and particularly to special mounts of non-metallic material such as nylon and a bracket for supporting it.

The invention will be described in its preferred embodiments in brake and camshaft assemblies but it may be capable of other uses wherein shafts are to be similarly supported.

This is a continuation-in-part of my copending application Serial No. 346,729 filed April 3, 1953 for Shaft and Like Mounting.

In heavy duty automotive brakes, the cam and camshaft are usually formed into a rigid unit with spaced bearing surfaces on the camshaft journalled respectively on needle bearings in a brake mechanism mounting plate near the camhead and on needle bearings in a support collar adjacent the splined end section where the motor operated lever is attached. This support collar is usually mounted on a bracket rigid with the axle.

An example of commercial construction employing the prior art mounting of brake camshafts is disclosed in United States Letters Patent No. 2,331,652. In such constructions difficulties in operation and maintenance have been encountered due to rust and corrosion of the metal parts and even in the needle bearings when lubrication has been neglected, and particularly because of the short rotative cycle of the camshaft the individual needle bearings eventually Brinell or gall the camshaft bearing surfaces, and the needles themselves flatten after long wear. These difficulties increase under conditions of faulty lubrication, and operation in cold climates.

The invention provides a structurally simple, lightweight, highly efficient and satisfactory shaft, pin or like bearing mounting made of a non-metallic material that is tough but hard enough to be machinable and which forms an excellent bearing surface for directly supporting the shaft without the need for intermediate bearings, is inert with respect to oil, grease, water, acids and most liquids and gases encountered in an automobile, and is thermally stable so as to have no appreciable dimensional or form changes under all weather conditions. The preferable material for these mounts, which I have tested and found to satisfy such requirements, is the tough abrasive resistant polymeric amide known in the trade as nylon and described for example in Carothers Patent 2,071,250, but any of the hard tough synthetic plastics or polymers having the required properties will be satisfactory. Other available synthetic plastic materials for example are the tetrafluoroethylene polymer known in the trade as Teflon and the acrylonitrile resin and rubber compound commonly known as Enrup, which latter is at present the least expensive of all of the foregoing.

It is therefore a major object of the invention to provide a novel shaft or like mount wherein the shaft is journalled in a normally lubricated bushing of abrasion resistant, tough, corrosion resistant non-metallic material that does not require lubrication to be an efficient bearing for at least a limited time.

It is a further object of the invention to provide a novel shaft, pin or like mounting wherein the shaft or pin is journalled directly within the bore of a non-metallic support collar, and resilient seal rings of normally circular cross-section mounted in internal grooves near the ends of the bore are compressed in the assembly between the shaft or pin and the support collar.

A further object of the invention is to provide a novel integral brake camshaft support collar of tough plastic material havng a smooth cylindrical internal bearing bore grooved near its opposite ends for sealing rings and having special external reenforcing ribs.

A further object of the invention is to provide a novel one-piece molded plastic camshaft support bushing of novel structure having a spherically surfaced end flange for mounting in a coacting support.

A further object of the invention is to provide a novel shaft or like bearing collar support of simplified construction.

Further objects of the invention will presently appear as the description proceeds in connection with the appended claims and the annexed drawings wherein:

Figure 1 is a fragmentary side elevation of a brake cam and camshaft assembly wherein the camshaft is supported according to a preferred embodiment of the invention;

Figure 2 is a fragmentary view illustrating an axle mounted camshaft support of the invention partly in plan and partly in section;

Figure 3 is a fragmentary sectional view illustrating the camshaft support of Figure 2 mainly in section;

Figure 4 is an end elevation of the support of Figure 2 broken away and in section to show the lubricant pressure vent opening.

Figure 5 illustrates in side elevation and partly in section a further embodiment of the invention using a different bracket for the collar;

Figure 6 is an end elevation of the assembly of Figure 5; and

Figure 7 illustrates an optional fastener arrangement for the assembly of Figure 5.

Referring to Figures 1–4, a plate bracket 12 which is fixed as by welding upon an axle housing (not shown) supports a socket 13 made of a pair of flanged annular sheet metal members 14 and 15 secured together by studs 16 and secured upon bracket 12 as by stud 17.

A brake camshaft 18 has a cylindrical bearing surface 19 near its inner end disposed in a camshaft mounting collar 21, and shaft 18 is splined at 22 beyond bearing surface 19 to receive the internally splined hub of an actuating lever 23 suitably connected to an air motor or the like.

At its other end camshaft 18 has a cylindrical bearing surface 24 directly journalled in a cylindrical bushing 25 in the brake backing plate 26 and terminates in a brake shoe operating cam 27. Bushing 25 is preferably a smooth bored cylinder of nylon which is freely rotatable with respect to bearing surface 24 and a press fit in the cylindrical bore 26' of the backing plate 26. Bushing 25 ends short of one flexible oil seal, and retainer assembly 25' of a conventional type provided at the ends of bore 26' and channel 80 is provided for the flow of grease to surface 24. These retainers primarily function to prevent the entrance of dirt into the interior of the bushing. The bushing may be lubricated through a suitable fitting in opening 30 which communicates with channel 80.

The camshaft mounting collar 21 comprises an open ended molded hollow member also preferably integrally made of nylon or an equivalent hard tough plastic material.

Support collar 21 is formed internally with a cylindrical smooth bore 28, and parallel annular grooves 29 and 31 are formed in surface 28 inwardly of the ends of the bore. Beyond grooves 29 and 31 the ends of collar 21 are internally shouldered at 32 and 33, leaving continuous narrow bearing surface lands 34 and 35 respectively between the bearing surface grooves and the end shoulders.

The sides of grooves 29 and 31 are tapered so as to converge inwardly to a flat bottom. In the assembly the camshaft bearing surface 19 is journalled directly within smooth bore 28. Seal rings 36 and 37 are made preferably of an oil and age resistant elastomer like synthetic rubber or equivalent plastic, and they are of circular cross section when relaxed. When mounted in the grooves 29 and 31 in the assembly they are radially compressed between collar 21 and bearing surface 19 because their inner diameter is selected slightly less than surface 19. Lubricant is introduced to bearing surface 19 through a suitable fitting 38 threaded into radial opening 40. This fitting is of a conventional type such as Alemite.

Support collar 21 is formed at one end with an enlarged socket attachment flange 39 the external periphery of which consists of a surface 41 that lies in a spherical envelope, and a plurality of depressions 42 below surface 41 so spaced that surface 41 is continuous about the flange but effectively zigzags from one side to the other as illustrated in Figure 2. The discontinuous flange surface provides adequate support with a minimum of actual contact with the metal hanger which makes assembly easier. Socket members 14 and 15 have axially extending annular rims 43 and 44 internally shaped to provide a spherical socket 45 that, when studs 16 are tight, grips surface 41 and prevent axial displacement and restrain rotation of collar 21 with respect to bracket 12.

Since surfaces 41 and 45 are of the same contour, assembly is facilitated, relative movement between the collar and bracket being permitted until the installation is complete and then final tightening of studs 16 rigidly connects collar 21 to the bracket 13.

The exterior of collar 21 is formed with a plurality of longitudinally extending reenforcing ribs 46, illustrated as eight, which slope down from the socket attachment flange, the grooves between the ribs being indicated at 47. In general each rib 46 extends axially in line with the adjacent areas of surface 41, but as shown in Figure 2, two adjacent ribs at the top of the collar are integrally joined to provide a wide rib 48 for mounting the lubricant fitting. This ribbed construction is particularly resistant to bending and is easy to handle.

Referring to Figures 1 and 4, a small radial vent opening 49 is provided through the collar 21. This opening 49 connects the lubricant space within the bore of collar 21 with atmospheric pressure outside the collar. Opening 49 is essentially only a pressure relief vent and is usually so small, about 1/16" diameter, that little or no dirt or moisture will tend to enter it. Also its outer end is shielded by being located preferably in a groove 47 between two ribs 46.

It has been found that provision of this vent opening 49 is quite important to lubrication of collar 21. Normally lubricant under pressure introduced through fitting 38 at pressures up to 6000 pounds per square inch encountered in usual lubrication systems. The sudden inrush of lubricant under pressure into the space between shaft surface 19 and the collar bore 28 may burst the collar or produce an overstressed section which will fracture during normal operation of the camshaft.

By providing pressure vent 49, this bursting or overstressing of the collar material is eliminated, and little or no lubricant actually goes out through opening 49.

It has been further determined that where fitting 38 is on top as in Figure 4, it is most desirable for practical operation to locate the opening 49 in the wall of collar 21 above the horizontal plane through the collar axis, or in any event in one of the quadrants on either side of the fitting 38. The reason for this is that the high lubricant pressures often cause shaft deflections which may block the inner end of opening 49 and prevent venting of the pressure build-up.

Figures 5, 6 and 7 illustrate an improved bracket for mounting collar 21 on the axle housing.

This bracket comprises a relatively thick rigid metal plate 51 of required strength to resist bending formed at its lower end with an arcuate face to suit the contour of rigid axle member 52. Plate 51 is rigid with axle member 52, as by the weld 53. Axle member 52 as illustrated is a tubular beam trailer axle, but it could be a rigid drive axle housing as far as the inventoin is concerned.

Plate 51 is formed with an opening to receive the collar 21 and the metal of the plate is formed around the opening into an integral socket element 54 having an internal spherically curved surface 55 adapted to engage surface 41 of the collar.

The other socket element 56 is formed integral with a sheet metal plate 57 thinner than plate 51 and having an internal spherical surface 58 to contact collar surface 41.

Plates 51 and 57 have flat coextensive portions removably secured together by capscrews 59 passing through openings in plate 57 and threaded at 61 in plate 51. Alternatively both plates 51 and 57 may be punched with aligned through holes for reception of bolt assemblies 62 of Figure 7.

The foregoing bracket structure is simple and easy to fabricate and install. Plate 51 is made permanent with the axle member and provides the major support of collar 21, plate 57 serving essentially as a retainer.

During assembly of the parts collar 21, with the O-rings in place, is slipped over surface 19 and held there during assembly with the spherical socket. The O-rings 36 and 37, while compressed to such an extent as to prevent axial flow of lubricant out of bore 28, have essentially little more than line contact with the bearing surface 19 and lubricant usually provides a film there and hence they do not impede rotation of the camshaft. By the same token the seal rings prevent any dirt from entering bore 28.

The invention provides an inexpensive, simple, non-metallic camshaft support collar which can be automatically made in mass production in plastic molding apparatus. The non-metallic bearing members of the invention are lighter in weight than prior bearings for the purpose and the lubricated plastic-steel bearing engagement is much more efficient than a lubricated metal bearing assembly and lasts longer. In test these nylon bearings have about four times the life of needle bearings and much greater life as compared to bronzze bushings. There is no undue deformation or galling of the camshaft bearing surfaces.

Actually lubrication of these bearings of the invention is not theoretically necessary since a dry steel-plastic bearing engagement of this type will function extremely well because of the low coefficient of friction of the nylon, but lubrication is provided primarily to keep out moisture and of course it further reduces the friction. Even if the lubricant leaks out or runs dry the bearing action is not impaired appreciably. This is a desirable safety factor aiding in brake efficiency.

The camshaft bearing collar of the invention and the socket hanger therefor are less subject to rust and corrosion than in the prior structure, and the bearings require fewer parts, which contributes to lower cost and reduced inventory.

Furthermore in practice I have found that tough plastics like nylon have valuable cold flow properties that render them useful for such bearings in that they conform themselves in size to the cooperating parts rather than wear. Thus the bearing efficiency increases with age.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a support, a shaft mounting on said support comprising an integral collar of tough, light weight thermally stable, substantially non-metallic plastic sufficiently thick-walled to be self-supporting and having a circumferentially continuous smooth cylindrical bore, a shaft having a cylindrical bearing surface directly journalled in said bore which closely surrounds said shaft in rotating bearing engagement therewith, seal ring grooves in said bore near and spaced inwardly of the opposite ends thereof, resilient rings having an inner diameter slightly less than said bearing surface disposed in said grooves and compressed between the shaft and collar, and means providing a passage through the collar intermediate said seal ring grooves for introducing lubricant through the collar to said bearing surface.

2. In the combination defined in claim 1, said collar being provided with an unobstructed pressure relieving vent opening intermediate said seal ring grooves communicating the interior of said bore with atmosphere and located in circumferentially displaced position relative to said lubricant introduction means.

3. In combination, a shaft having a cylindrical bearing surface, a tough lightweight molded plastic support collar for said shaft sufficiently thick-walled to be self-supporting and having an internal circumferentially continuous cylindrical bore closely surrounding said bearing surface and directly engaging the latter with a rotating bearing fit, a pair of internal grooves in said bore located in parallel relation and adjacent opposite ends of the bore, resilient seal rings of normally circular cross-section disposed in said grooves and compressed between said bearing surface and the support collar, means providing a passage through said collar intermediate said grooves for introducing lubricant under pressure into said bore between the seal rings, and a pressure relieving vent for said bore also located in said collar intermediate said grooves.

4. In a brake mechanism, a metal brake camshaft having a cylindrical bearing surface, a molded plastic open-ended support collar having a circumferentially continuous smooth cylindrical bore closely surrounding said surface in direct rotary bearing engagement therewith, said collar being sufficiently thick-walled to be self-supporting and having at one end an integral enlarged portion provided with an annular external surface of spherical contour symmetrical about the axis of the collar, and a metal hanger for said support collar having an internally spherical socket surrounding and clamped about said annular surface so as to provide a universal mounting for said collar.

5. A combined support and bearing unit for a shaft consisting of an open-ended integral hollow collar of non-metallic hard tough material sufficiently thick-walled to be self-supporting and having a smooth longitudinal circumferentially continuous cylindrical bore forming a direct shaft bearing surface, seal ring grooves spaced inwardly of and near opposite ends of the bore, and an enlarged integral socket attachment flange at one end in surrounding relation to one of said grooves.

6. A combined bearing and support unit for a shaft consisting of an integral open-ended continuous collar of hard, tough plastic material sufficiently thick-walled to be self-supporting and formed at one end with an enlarged mounting flange having a substantially spherically curved external surface and having an internal cylindrical bore, and seal ring grooves recessed into the surface of said bore adjacent the opposite ends of said bore, said collar having a lubricant fitting mounting opening leading to said bore in a portion spaced from said flange and a small pressure relieving vent opening communicating said bore with atmosphere, and both said opening and vent being located axially between said grooves.

7. The support defined in claim 6 wherein said fitting mounting opening and said vent opening are generally radial and located substantially within 90° of each other circumferentially of the collar.

8. In combination, a metal brake control shaft, means in which said shaft is mounted for rocking movement during operation comprising an integral collar of tough light weight non-metallic plastic having a smooth cylindrical bore in which a cylindrical section of said shaft is directly journalled, said collar having sufficient wall thickness to be self-supporting, seal ring grooves near and spaced inwardly of the opposite ends of said collar, resilient O-rings compressed in said grooves surrounding said cylindrical shaft section, means providing a lubricant introduction passage and fitting at a side of said collar intermediate said grooves, and a support for said collar having a portion secured tightly about said collar.

References Cited in the file of this patent

UNITED STATES PATENTS

| | | |
|---|---|---|
| 1,149,299 | Shearer | Aug. 10, 1915 |
| 1,995,548 | Mermigis | Mar. 26, 1935 |
| 2,015,233 | Pfleger | Sept. 24, 1935 |
| 2,106,860 | Tibbetts | Feb. 1, 1938 |
| 2,331,652 | Buckendale | Oct. 12, 1943 |
| 2,497,224 | Laure | Feb. 14, 1950 |
| 2,675,283 | Thomson | Apr. 13, 1954 |
| 2,690,360 | Young | Sept. 28, 1954 |